UNITED STATES PATENT OFFICE.

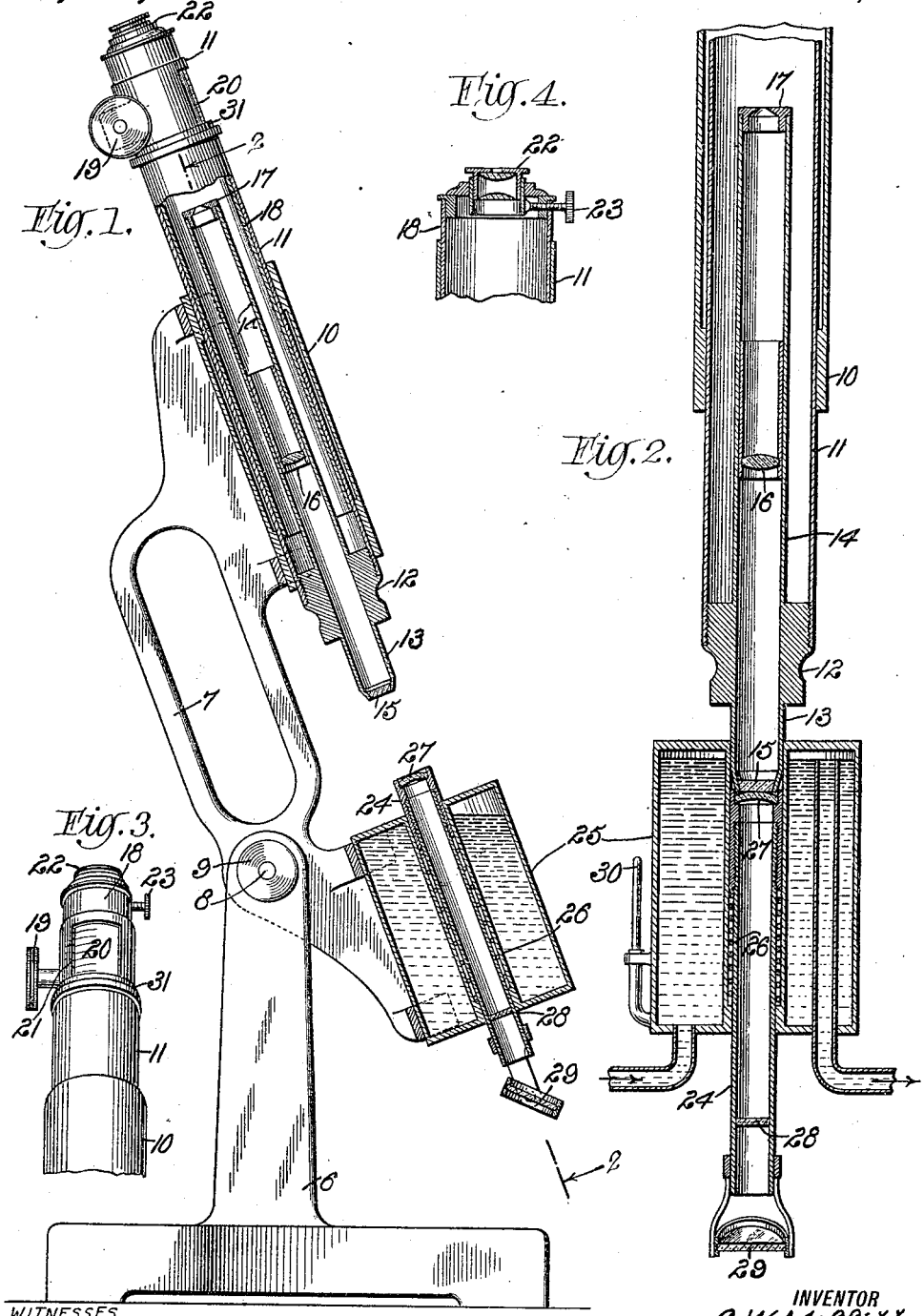

GEORGE WILBER MOFFITT, OF ST. LOUIS COUNTY, MISSOURI.

REFRACTOMETER.

1,230,754.  Specification of Letters Patent.  Patented June 19, 1917.

Application filed July 7, 1916. Serial No. 107,941.

*To all whom it may concern:*

Be it known that I, GEORGE W. MOFFITT, a citizen of the United States, and a resident of St. Louis county, in the State of Missouri, have invented a new and Improved Refractometer, of which the following is a full, clear, and exact description.

My invention relates to an optical instrument for measuring the indices of refraction of liquids by direct reading from a scale, depending on the optical system used.

An object of the invention is to provide a simple, sensitive and easily operable instrument for direct reading of the indices of refraction of liquids.

A further object of the invention is to provide an optical system so arranged that the variation in the position of the focus is in direct proportion to the variation of the index of refraction of one of the elements of the system.

A still further object of the invention is to provide an optical system in which one of the optical elements is a liquid, the refraction of which is to be determined, and which liquid can be easily and quickly placed or removed from the optical system.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical section through an optical instrument embodying my invention, a portion thereof being shown in elevation;

Fig. 2 is a vertical section on line 2—2, Fig. 1, showing the apparatus when a reading is made therewith;

Fig. 3 is a front elevation of the eye piece and the upper portion of the instrument; and Fig. 4 is a section through the eye piece and the upper portion to show the details of construction.

Referring to the drawings, 6 is a stand supporting a carrier 7 on a pivot 8 provided with threaded members 9, permitting the clamping of the carrier at any desired angle on the support. The carrier 7 at the upper part thereof has a tubular bearing 10 in which a tube 11 slides.

The tube 11 at its lower end carries a plug 12 which has an outwardly directed tubular extension 13 forming a nose. The plug 12 has also an inwardly directed tubular extension 14, both extensions being coaxial with the tube 11. The extremity of the nose 13 carries a plane transparent member 15, which is preferably made of glass, having the two surfaces parallel and disposed at right angles to the axes of the tubular extensions and is coaxial therewith. A converging lens 16 is mounted within the tubular extension 14 at a distance such that if parallel rays were incident upon the upper face of the said lens they would be brought to a focus at the exterior plane surface of the plane lens 15. A stop 17 is secured to the tubular extension 14 above the converging lens 16 preferably in the upper focus thereof, or nearer the lens 16.

A focusing tube 18 is mounted to telescope in the tube 11. The movement is controlled by a rack and pinion 19, a linear scale 20 being provided on the focusing tube 18 to indicate the displacement of said tube 18 relative to the tube 11. The tube 11 has a vernier 21 coöperating with the scale 20. The upper end of the tube 18 carries an eye piece 22 which is of fairly high power and mounted to move laterally or at right angles to the longitudinal axis of the lenses through the medium of a screw 23. The purpose of the lateral movement is to enable the user to bring the image and the eye-piece scale into coincidence. The above-described structure with the exception of the plane lens 15 forms a microscope.

A tube 24 is mounted on the carrier 7 so that the axis thereof alines with the microscope. The said tube is preferably mounted to telescope in a heating jacket 25 through which a heating medium may be circulated. The upper end of the tube is normally maintained above the heating jacket by a spring 26. The said end of tube 24 carries a lens 27 which presents a convex surface opposite the plane lens 15. The inner surface of said lens may be of any suitable form but preferably the lens 27 is convexo-concave the curved surfaces of which are concentric. The convex surface faces the plane lens 15. The edge of the tube at the lens projects above the margin to form a rim, which will prevent a drop of liquid placed thereupon from running off. The diameter of the rim is sufficiently large not to interfere with the extremity of the nose when the plane lens 15 is brought into contact with the convexoconcave lens 27 by moving the tube 11 in the bearing 10. By bringing the lens 15 and the lens 27 into contact the fluid inclosed therebetween will form a plano-concave lens through which the light must pass to the eye piece 22. In bringing the tube 11 on to the tube 24, the upper end of tube 24 as well as the lenses are caused to enter the jacket 25, thus interference of extraneous light with the system is prevented.

The tube 24 adjacent its lower end carries within a transparent object scale 28. A mirror 29 is provided at the lower end of the tube 24 to reflect light rays through the object scale, lenses 27 and 15 with the liquid placed therebetween, the converging lens 16 and the eye piece 22. The jacket 25 is provided with a thermometer 30 for indicating the temperature of the heating medium circulating therethrough.

To use the instrument a drop of the liquid whose index of refraction is to be determined is placed on the convex surface of the lens 27. The tube 11 is then lowered until the exterior surface of the plane lens 15 contacts with the upper surface of the lens 27. The liquid forms a thin lens between the two lenses. The tube is pushed down until the collar 31 thereupon prevents further movement of the tube 11. Light is then thrown through the instrument by means of the mirror 29. The eye piece is then focused on the eye piece scale. The focusing tube 18 is then moved by the rack and pinion arrangement 19 until the image of the object scale is of the same size as the eye piece scale. The image and the eye piece scales are brought into coincidence by means of the screw 23, and when image and eye piece scales are coincident throughout the adjustment is complete. The value of the index is then read off on the scale on the tube 18 by means of the vernier 21 at the top of the tube 11. The tube 11 is then lifted, whereupon the top of the tube 24 rises above the heating jacket. The two glass surfaces of the lens 15 and lens 27 being separate can be easily cleaned of the liquid the index of refraction of which has been determined, and any new determinations can then be made. It will be noted that this arrangement permits an easy cleaning of the surfaces and a quick interchange of liquid, which is important when a large number of determinations or indices of refraction of different liquids is to be made successively.

From the above it will be seen that the adjustments of the instrument are few and simple. The converging lens 16 and the plane lens 15 must be carefully fixed with respect to each other, for the correctness of the scale 20 depends upon it. If the system be lined up with a telescope focused for parallel rays by means of the autocollimation method, the adjustment may be made by eliminating parallax between the cross wires of the telescope and the images of fine dust particles on the exterior surface of the plane lens 15. If the lens is not achromatic, this adjustment should be made with monochromatic light of the wave length for which the instrument is to read correctly.

The size of divisions of the scale is independent of the apparent distance of the object scale from the curved liquid surface, but the actual distance of the focal plane depends upon this distance. This can be illustrated by a mathematical discussion which, not forming part of the invention, is not given. With air in the instrument, set the focusing tube at unity on the scale, then adjust the position of the object until the proper focus is obtained. The ratio of the image size to the apparent object size due to the refraction of the lower surface lens 27 is equal to the ratio of the focal length of the converging lens to the apparent distance of the object scale from the curved liquid surface. Therefore if the two scales are ruled with divisions in the above ratio, the one may be used as an eye piece scale and the other as an object whose image is formed in the eye piece. When the focusing is completed the image and eye-piece scale will be equal in size.

I claim:

1. An optical instrument for measuring the indices of refraction of liquids, comprising in combination a plurality of lenses one of which is formed of liquid the refraction of which is to be measured, means for adjusting the relation between the lenses so that the variation in the position of the focus is in direct proportion with the variation of the index of refraction of the liquid lens and means for maintaining the liquid lens at a predetermined temperature.

2. An optical instrument for measuring the indices of refraction of liquids, comprising in combination transparent means for forming a planoconcave lens of a liquid the refraction of which is to be measured, a microscope coöperating with the liquid lens, an object scale, and means for directing light through the object scale and liquid lens to the microscope.

3. An optical instrument for measuring the indices of refraction of liquids, comprising in combination a microscope, transparent means adapted to present a liquid in the form of a planoconcave lens coaxial with the microscope, said transparent means presenting surfaces parallel with the surfaces of the liquid lens formed, an object scale, and means for directing light through the object scale and transparent means to the microscope.

4. An optical instrument for measuring the indices of refraction, comprising in combination a system of lenses adapted to include one element of predetermined form the refraction of which is to be determined, and means for adjusting the system so that the variation in the position of the focus of the system is in direct proportion to the variation of the index of refraction of the element to be determined.

5. An optical instrument for measuring the indices of refraction of liquids, comprising in combination a system of lenses one element of which is formed of liquid the refraction of which is to be measured, and means for adjusting the system so that the variation in the position of the focus is in direct proportion to the variation of the index of refraction of the liquid element employed in the system.

6. An optical instrument for measuring the indices of refraction of liquids, comprising in combination a microscope, transparent means adapted to present a liquid in the form of a lens coaxial with the microscope, said transparent means presenting surfaces parallel with the surface of the liquid lens formed, an object scale, means for directing light through the object scale and transparent means to the microscope, and means for adjusting the microscope relative to the liquid lens formed.

7. An optical instrument for measuring the indices of refraction of liquids, comprising in combination transparent means for forming a lens of a liquid the refraction of which is to be measured, said transparent means presenting surfaces parallel with the surfaces of the liquid lens formed, a converging lens adapted to be placed coaxial with the liquid lens formed and at a predetermined distance therefrom, an object scale, means for directing light through the object scale and liquid lens to the converging lens, an eye piece associated with the converging lens, means for varying the distance between the eye piece and the converging lens, and means for indicating the displacement.

8. An optical instrument for measuring the indices of refraction of liquids, comprising in combination transparent means for forming a planoconcave lens of the liquid the refraction of which is to be measured, said transparent means presenting surfaces parallel with the surfaces of the liquid lens formed, an object scale, a converging lens coaxial with the liquid lens and at a predetermined distance therefrom, an eye piece coaxial with the converging lens and adjustable to and from said lens, means for indicating the displacement of the eye piece from the converging lens, and means below the object scale for directing light to the eye piece through all the elements located between said means and the eye piece.

9. An optical instrument for measuring the indices of refraction of liquids, comprising in combination a tubular member presenting at one end thereof a convexo-concave lens, an object scale within said tubular member adjacent the other end, a tubular member coaxial with the first-mentioned tubular member and spaced therefrom, a lens having parallel plane surfaces carried by one end of said second tubular member and disposed in proximity to the lens in the first-mentioned tubular member and coaxial therewith, a converging lens within said tubular member at a predetermined distance from said plane lens, means for bringing said second tubular member into engagement with the first, an eye piece coaxial with the converging lens and adjustable to and from said lens, means for indicating the displacement of the eye piece relative to the converging lens, and means associated with the first-mentioned tube for directing light through said first and second tubes.

10. An optical instrument for measuring the indices of refraction of liquids, comprising in combination, a carrier, a pair of spaced, coaxial tubes each mounted to telescope in the carrier whereby the adjacent ends of the tubes may be brought into engagement, transparent members associated with said ends and adapted to form a planoconcave liquid lens therebetween, an object scale within one of said tubes at a predetermined distance from the transparent member, a converging lens in the other tube at a predetermined distance from its transparent member, an eye piece coaxial with the converging lens and adjustable to and from, means for indicating the displacement of the eye piece relative to the converging lens, and means for directing light through the object scale, transparent members, and converging lens, to the eye piece.

11. An optical instrument for measuring the indices of refraction of liquids, comprising in combination a tubular member presenting at one end thereof a convexo-concave lens, a second tubular member mounted to telescope to and from said first tubular member and coaxial therewith presenting a lens having parallel plane surfaces and which is adapted to engage the convex surface of the first-mentioned lens, said first tubular member having a rim at the lens to retain a liquid between the two lenses, a converging lens within the second mentioned tubular member at a predetermined distance from the plane lens and coaxial therewith, an object scale within the first mentioned tubular member at a predetermined distance from the convexo-concave lens, an eye piece coaxial with the converging lens and adjustable to and from, means for indicating the displacement of the eye piece relative to the converging lens, and means associated with the first-mentioned tubular member for directing light through the first and second tubular members.

12. An optical instrument for measuring the indices of refraction of liquids, comprising in combination a carrier, a pair of coaxial spaced tubular members mounted to telescope in said carrier, yielding means associated with one of the tubular members to move one end thereof toward the other tubular member, a convexo-concave lens in the said end of said tubular member, a lens having parallel plane surfaces associated with the adjacent end of the other tubular member, said plane lens adapted to engage the convex surface of the convexo-concave lens when the other tubular member is telescoped toward the first tubular member and whereby said end of said first tubular member is moved into the carrier against the resistance of the yielding means, said convexo-concave lens having a rim raised above the margin thereof to prevent liquid from rolling off the convex surface thereof, a converging lens within the said second tubular member at a predetermined distance from the plane lens and coaxial therewith, an eye piece coaxial with the converging lens and adjustable to and from said lens, means for indicating the displacement of the eye piece relative to the converging lens, an object scale within the first-mentioned tubular member at a predetermined distance from the convexo-concave lens, and reflecting means associated with said first tubular member for directing light through said first and second tubular members to the eye piece.

13. An optical instrument for measuring the indices of refraction of liquids, comprising in combination a carrier, a heating jacket on the carrier, a tubular member mounted to telescope in the jacket, yielding means for raising the upper end of the tubular member above the jacket, a convexo-concave lens in the upper end of said tubular member, the curved surfaces of said lens being concentric, an object scale within said tubular member opposite the concave surface of the lens and coaxial therewith, a second tubular member coaxial with the first and mounted to telescope in the carrier to and from the upper end of the first tubular member, a lens having parallel plane surfaces secured to the second tubular member to engage the convexo-concave lens of the first member when the second tubular member is telescoped to engage the first tubular member and whereby the upper end of said first tubular member is depressed below the surface of the heating jacket, said convexo-concave lens having a rim at the margin thereof for preventing a liquid from rolling off the convex surface of said lens, a converging lens within the second tubular member coaxial with the plane lens and at a predetermined distance therefrom, an eye piece coaxial with the converging lens and adjustable to and from, means for indicating the displacement of the eye piece relative to the converging lens, and reflecting means associated with the lower end of the first-mentioned tubular member for directing light through said first and second tubular members.

14. An optical instrument for measuring the indices of refraction of liquids, comprising in combination transparent means, carriers therefor normally maintaining said transparent means spaced and coaxial with one another, supporting means for said carriers whereby one of the carriers may be brought into engagement with the other to bring the two transparent means in contact whereby a liquid lens may be formed therebetween, a microscope coaxial with one of the carriers and movable relative thereto, an object scale associated with the other carrier, and means for directing light through the carriers to the microscope.

15. An optical instrument for measuring the indices of refraction of liquids, comprising in combination spaced transparent members disposed coaxially, means for bringing the transparent members into contact whereby a liquid lens may be formed therebetween, the refraction of which liquid is to be measured, a microscope coöperating with one of the transparent members, an object scale coöperating with the other transparent member, and means for directing light through the object and transparent members to the microscope.

16. An optical instrument for measuring the indices of refraction of liquids, comprising in combination a convexo-concave lens the curved surfaces of which are concentric, a plane lens having parallel plane surfaces spaced from the convex surface of the convexo-concave lens and coaxial therewith, means for bringing said plane lens into contact with the convexo-concave lens whereby a plano-concave liquid lens may be formed between the plane and convexo-concave lens, a converging lens coaxial with the plane lens and at a predetermined distance therefrom, an eye piece coaxial with the converging lens and adjustable to and from, means for indicating the displacement of the eye piece from the converging lens, an object scale facing the concave surface of the convexo-concave lens, and reflecting means for directing light through the object scale and all the lenses located between the eye piece and said reflecting means.

17. An optical instrument for measuring the indices of refraction of liquids, comprising in combination, a system of lenses, one element of which is formed of liquid the refraction of which is to be measured, means for adjusting the system so that the variation in the position of the focus is in direct proportion to the variation of the indices of refraction of the liquid element and means for maintaining said liquid element at a predetermined temperature.

18. An optical instrument for measuring the indices of refraction of liquids, comprising in combination, a heating jacket, transparent means adapted to present a liquid in the form of a lens in the jacket, a microscope coöperating with the liquid lens, and means for directing light through the liquid lens to the microscope.

19. An optical instrument for measuring the indices of refraction of liquids, comprising in combination, transparent members disposed coaxially, means for bringing the transparent members into contact whereby a liquid lens may be formed therebetween, a heating jacket adapted to receive said transparent members when a liquid lens is formed therebetween whereby said liquid lens may be maintained at a predetermined temperature, a microscope coöperating with one of the transparent members, an object scale coöperating with the other transparent member, and means for directing light through the scale and transparent members to the microscope.

20. An optical instrument for measuring the indices of refraction of liquids, comprising in combination, a carrier, a heating jacket on the carrier, a tubular member mounted to telescope in the jacket, a second tubular member coaxial with the first and mounted to telescope in the carrier, means associated with the adjacent ends of the two tubular members for forming a liquid lens when said two tubular members are brought together, means for bringing the two tubular members together and whereby the meeting ends thereof may be located within the heating jacket, a microscope associated with the second tubular member, and a reflector associated with the first tubular member for directing light through the liquid lens to the microscope.

21. An optical instrument for measuring the indices of refraction of liquids, comprising in combination, a carrier, a heating jacket on the carrier, a tubular member mounted to telescope in the jacket, yielding means for raising one end of the tubular member above the jacket, a second tubular member coaxial with the first and mounted to telescope in the carrier, transparent means associated with the adjacent ends of the tubular members for forming a liquid lens therebetween when the second tubular member is telescoped to engage the first, means for telescoping said second tubular member whereby the projecting end of the first tubular member may be depressed into the jacket, a microscope associated with the second tubular member, and a reflector associated with the first tubular member for directing the light through the transparent means and liquid lens to the microscope.

22. An optical instrument for measuring the indices of refraction of liquids, comprising in combination, a carrier, a heating jacket on the carrier, a spring-actuated tubular member mounted in the jacket so that one end thereof may be depressed into the jacket, a second tubular member coaxial with the first and mounted to telescope in the carrier, lenses carried by the adjacent ends of the tubular members, means for telescoping the second member toward the first whereby the lenses may be brought into contact within the heating jacket, said lenses being adapted to form a planoconcave liquid lens, a microscope associated with the second tubular member, and a reflector associated with the first number for directing light through the lenses to the microscope.

GEORGE WILBER MOFFITT.

Copies of this patent may be obtained for five cents each, by addressing the "Commissioner of Patents, Washington, D. C."